(12) United States Patent
Karkkainen

(10) Patent No.: US 9,367,150 B2
(45) Date of Patent: Jun. 14, 2016

(54) APPARATUS AND ASSOCIATED METHODS

(75) Inventor: Asta Maria Karkkainen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 880 days.

(21) Appl. No.: 12/784,349

(22) Filed: May 20, 2010

(65) Prior Publication Data

US 2011/0285637 A1 Nov. 24, 2011

(51) Int. Cl.

| G08B 6/00 | (2006.01) |
|---|---|
| G06F 3/041 | (2006.01) |
| G09G 5/00 | (2006.01) |
| G06F 3/0354 | (2013.01) |
| G06F 3/01 | (2006.01) |
| G09G 3/00 | (2006.01) |

(52) U.S. Cl.
CPC ............ *G06F 3/03547* (2013.01); *G06F 3/016* (2013.01); *G06F 3/041* (2013.01); *G08B 6/00* (2013.01); *G09G 3/001* (2013.01); *G09G 2354/00* (2013.01); *G09G 2380/14* (2013.01)

(58) Field of Classification Search
CPC .................................. G06F 3/016; G08B 6/00
USPC ............................ 345/173–178; 715/700–702
See application file for complete search history.

(56) References Cited

U.S. PATENT DOCUMENTS

| 5,583,478 A | 12/1996 | Renzi |
| 5,709,219 A | 1/1998 | Chen et al. |
| 6,930,590 B2 | 8/2005 | Ling et al. |
| 7,070,837 B2* | 7/2006 | Ross ............................... 428/1.1 |
| 7,245,292 B1* | 7/2007 | Custy ............................ 345/173 |
| 2004/0169483 A1* | 9/2004 | Hardwick ............... G06F 3/016 318/560 |
| 2006/0279537 A1* | 12/2006 | Kim et al. ..................... 345/156 |
| 2009/0079550 A1* | 3/2009 | Makinen et al. ........... 340/407.2 |
| 2009/0237364 A1* | 9/2009 | Bloomcamp et al. ......... 345/173 |
| 2010/0156822 A1 | 6/2010 | Lee et al. ...................... 345/173 |
| 2010/0231550 A1* | 9/2010 | Cruz-Hernandez et al. ... 345/174 |
| 2011/0074733 A1* | 3/2011 | Makinen et al. .............. 345/174 |
| 2011/0102462 A1* | 5/2011 | Birnbaum ..................... 345/647 |

FOREIGN PATENT DOCUMENTS

| EP | 1 594 042 A2 | 11/2005 |
| EP | 1 594 043 A2 | 11/2005 |
| WO | WO 2009/037379 A1 | 3/2009 |
| WO | WO 2009/071919 A1 | 6/2009 |
| WO | WO-2009/097866 A1 | 8/2009 |
| WO | WO 2010/134349 A1 | 11/2010 |
| WO | WO 2011/001229 A1 | 1/2011 |

* cited by examiner

*Primary Examiner* — Amr Awad
*Assistant Examiner* — Stephen Bray
(74) *Attorney, Agent, or Firm* — Harrington & Smith

(57) ABSTRACT

An apparatus for a user interface of an electronic device, the apparatus comprising a textured surface having a predetermined roughness, the textured surface configured to produce a first predefined vibration in the skin of a user of the apparatus on physical interaction with the skin of the user, wherein the roughness of the textured surface is configured such that the first predefined vibration produced by the physical interaction has a frequency and/or amplitude which is detectable by a specific mechanical receptor in the skin of the user.

13 Claims, 5 Drawing Sheets

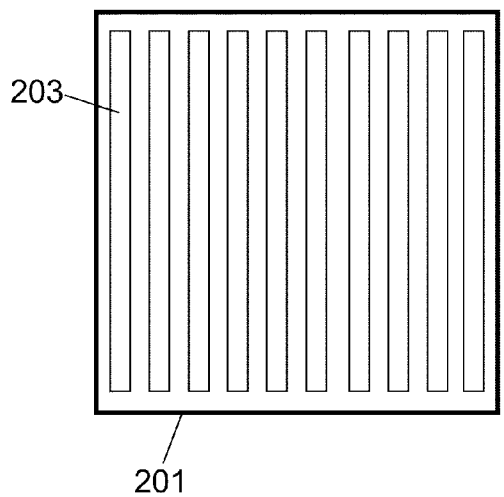
Figure 2a
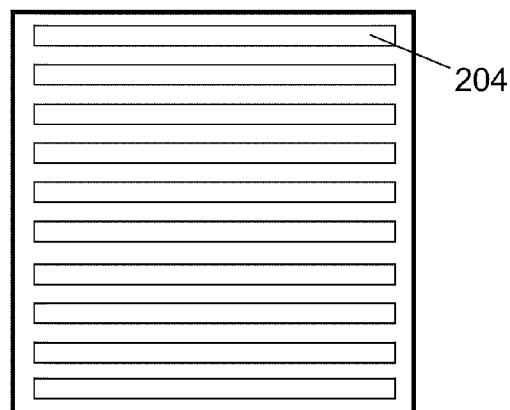
Figure 2b
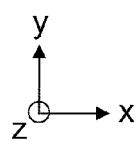
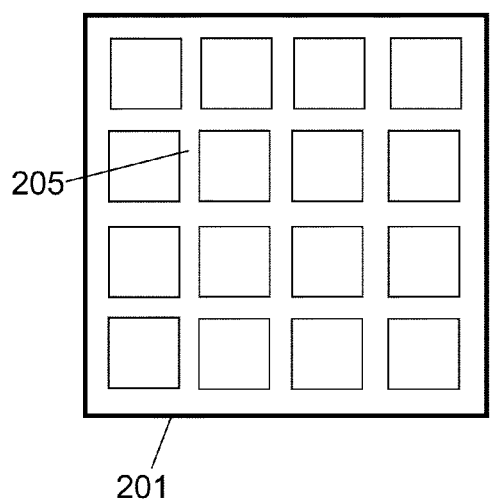
Figure 2c
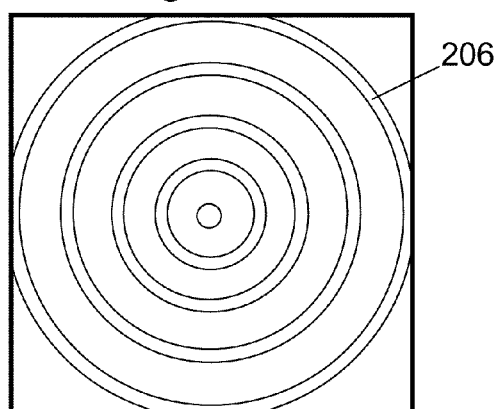
Figure 2d

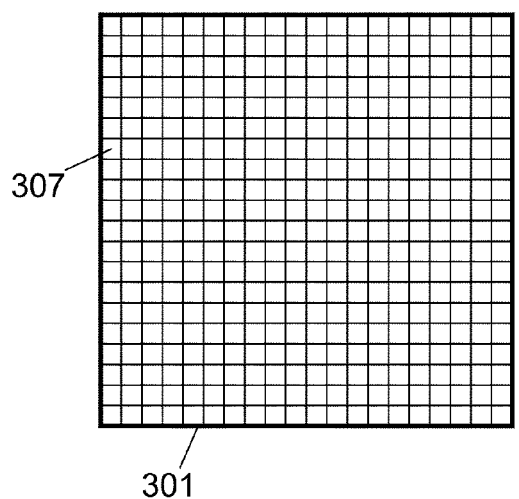
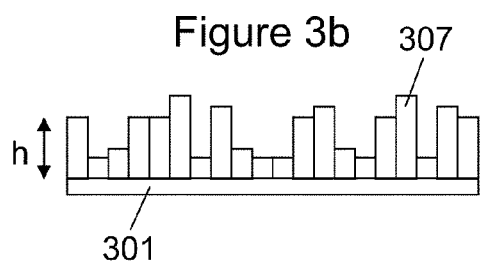
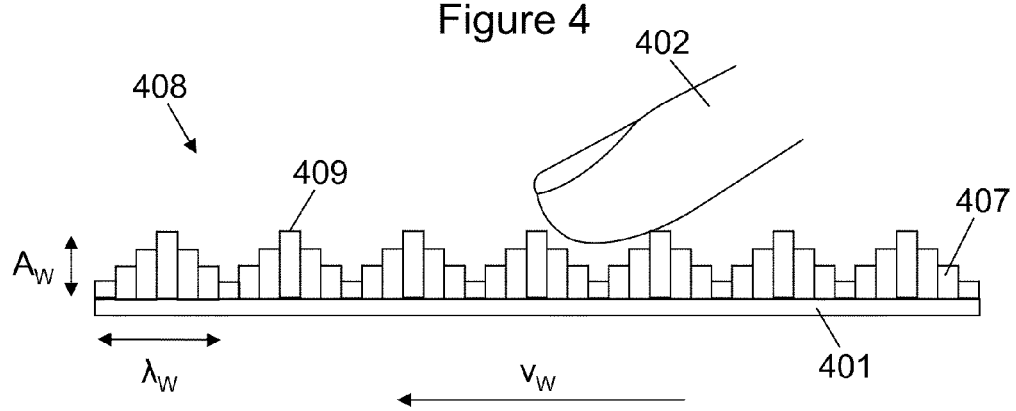

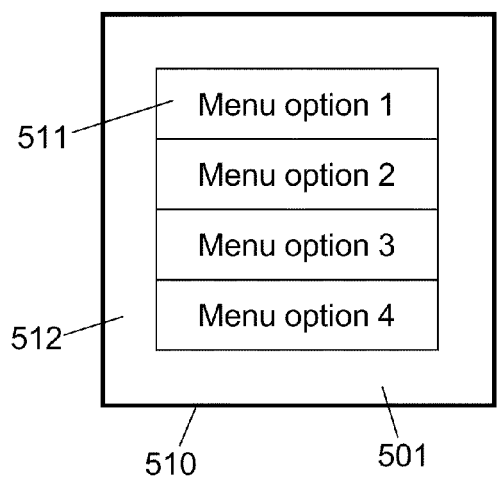
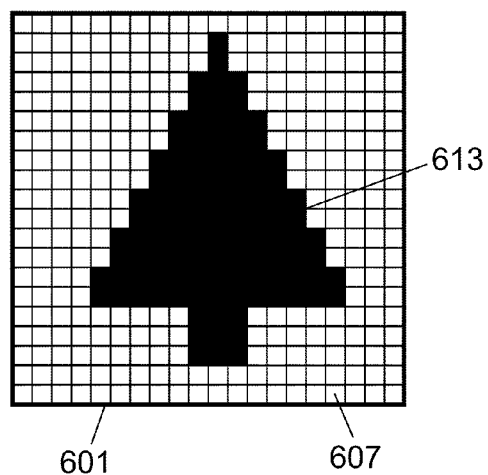
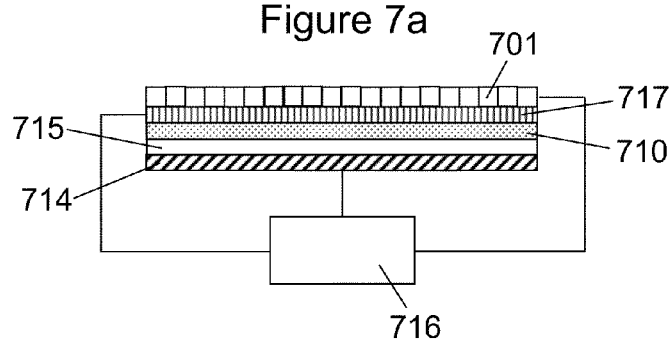
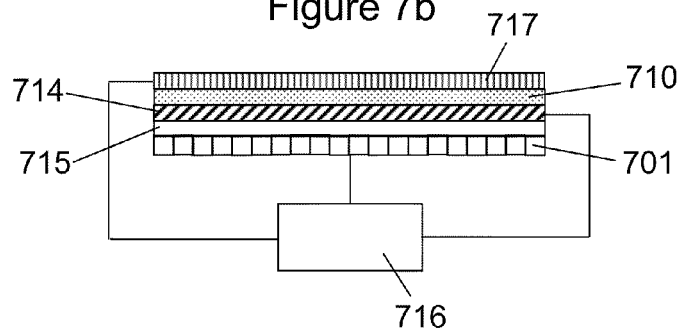

APPARATUS AND ASSOCIATED METHODS

TECHNICAL FIELD

The present disclosure relates to the field of tactile feedback, associated apparatus, methods and computer programs, and in particular, some embodiments concern an apparatus and methods for tuning tactile feedback to the detectable frequency range of a particular human mechanical receptor. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed aspects/embodiments may provide one or more audio/text/video communication functions (e.g. telecommunication, video-communication, and/or text transmission, Short Message Service (SMS)/Multimedia Message Service (MMS)/emailing functions, interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Haptic technology is a tactile feedback technology which takes advantage of a user's sense of touch by applying forces, vibrations, and/or motions upon the user to convey information. In the past, tactile feedback has been used to assist in the creation and control of virtual objects (i.e. objects existing only in a computer simulation), and to enhance control of remote machines and devices.

More recently, however, haptic technology has been used in portable electronic devices to supplement visual content. For example, some devices use haptic technology to produce vibrations in response to touch. This may be combined with touch-sensitive screens, where the vibrations can be used to acknowledge selection of on-screen content by the user. In other devices, vibrations have been used to direct a user to a particular on-screen feature, and even to create a tactile representation of an image to enable perception of displayed content with reduced cognitive effort (as described in WO 2009/097866 A1).

Human skin uses four different mechanical receptors (mechanoreceptors) to detect pressure, vibrations and texture. These include the Meissner corpuscle, the Merkel disc, the Pacinian corpuscle, and the Ruffini ending. Known haptic devices typically stimulate these receptors using one or more of the following: pneumatic stimulation (jets of pressurised air), vibro-tactile stimulation (vibrating actuators), electrotactile stimulation (electric fields), and functional neuromuscular stimulation (electric currents).

The perception of surface texture is mediated by vibrations in the skin, which are encoded by Merkel discs, Meissner corpuscles and Pacinian corpuscles. In general, different textures give rise to different frequencies of vibration. Pacinian corpuscles can detect vibrations with frequencies of between 70 and 1000 Hz, but are especially susceptible to vibrations in the 200-400 Hz range (corresponding to the frequencies generated upon a finger tip by textures comprising features smaller than 200 µm when the finger is moved at a speed of 0.1 m/s). On the other hand, Meissner corpuscles have a higher sensitivity when sensing vibrations with a frequency of 10-50 Hz (corresponding to features of between 2 and 10 mm in size at a finger speed of 0.1 m/s). Similarly, Merkel discs can detect vibrational frequencies of 5-15 Hz (corresponding to a lengthscale of around 6-20 mm).

To enable the accurate detection of surface texture, it would be beneficial if haptic devices induced skin vibrations at frequencies most detectable by the specific mechanoreceptors. Many known haptic systems, however, do not stimulate mechanoreceptors selectively or precisely, and as a result, are less effective at conveying tactile information to the user.

The apparatus and associated methods disclosed herein may or may not address this issue.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

According to a first aspect, there is provided an apparatus for a user interface of an electronic device, the apparatus comprising a textured surface having a predetermined roughness, the textured surface configured to produce a first predefined vibration in the skin of a user of the apparatus on physical interaction with the skin of the user, wherein the roughness of the textured surface is configured such that the first predefined vibration produced by the physical interaction has a frequency and/or amplitude which is detectable by a specific mechanical receptor in the skin of the user.

The frequency and/or amplitude may correspond to one or more of the following types of mechanical receptor: Merkel discs, Meissner corpuscles, and Pacinian corpuscles. The textured surface may comprise a plurality of actuating elements. Each actuating element may be configured such that the height of the actuating element can be varied independently of the other actuating elements to enable the roughness of the textured surface to be modified. Each actuating element may be configured such that the height of the actuating element can be varied independently of the other actuating elements to allow the generation of transverse waves in the textured surface. Interaction of the transverse waves with the skin of the user may be configured to produce the first predefined vibration.

The textured surface may comprise two or more regions. The textured surface may be configured such that the roughness at one region is different from the roughness at another region. The textured surface may comprise one or more of the following structural configurations: rows, columns, concentric circles, fingerprint swirls, and a grid. The textured surface may comprise a coating. The coating may have one or more of the following properties: hydrophobic, oleophobic, and scratch proof.

The apparatus may comprise a capacitive element. The capacitive element may be configured to allow establishment of an electric field of varying strength between the capacitive element and a user of the apparatus. Variations in electric field strength may be configured to interact with the skin of the user to produce a second predefined vibration in the skin of the user independently of the textured surface.

The apparatus may be configured such that the predetermined roughness of the textured surface provides a predetermined modification to the frequency and/or amplitude of the second predefined vibration produced by the variations in electric field strength. The frequency and amplitude may be modified independently of one another. The predetermined modification may produce a third predefined vibration in the skin of the user when the capacitive element is activated which has a frequency and/or amplitude that is detectable by a specific mechanical receptor.

The capacitive element may comprise an electrical conductor, an electrical insulator and a power supply. The power supply may be configured to charge the electrical conductor. The electrical insulator may be configured to prevent a flow of current from the charged electrically conducting layer to the skin of the user when the user is proximate to the capacitive element. The power supply may be configured to vary the magnitude of charge on the electrical conductor (by varying the applied voltage) to cause the variations in electric field strength.

The capacitive element may comprise a plurality of segments. Each segment may be configured to allow establishment of an electric field of varying strength between the segment and the user independently of the other segments. Variations in electric field strength may be configured to interact with the skin of the user to independently produce second predefined vibrations in the skin of the user.

According to another aspect, there is provided an electronic display comprising any apparatus described herein. The electronic display may comprise a touch sensitive component. The touch sensitive component may be configured to allow a user of the apparatus to interact directly with content shown on the electronic display by touching the electronic display.

According to another aspect, there is provided a module for an electronic device comprising any apparatus described herein.

According to another aspect, there is provided an electronic device comprising any apparatus described herein. The electronic device may be a portable electronic device. The portable electronic device may be a portable telecommunications device.

According to another aspect, there is provided an apparatus for a user interface of an electronic device, the apparatus comprising a capacitive element and a textured surface, both the capacitive element and the textured surface configured to independently produce predefined vibrations in the skin of a user of the apparatus,
  the textured surface having a predefined roughness to produce a first predefined vibration on independent physical interaction with the skin of the user,
  the capacitive element configured to allow establishment of an electric field of varying strength between the capacitive element and the user, variations in electric field strength configured to independently interact with the skin of the user to produce a second predefined vibration,
  and wherein the apparatus is configured such that the predetermined roughness of the textured surface provides a predetermined modification to the second predefined vibration produced by the variations in electric field strength to produce a third predefined vibration when the capacitive element is activated.

The apparatus may be configured such that the predetermined roughness of the textured surface provides a predetermined modification to the frequency and/or amplitude of the second predefined vibration produced by the variations in electric field strength. The predetermined modification may produce a third predefined vibration when the capacitive element is activated which has a frequency and/or amplitude that is detectable by a specific mechanical receptor in the skin of the user.

According to another aspect, there is provided a method of producing a predefined vibration in the skin of a user of an apparatus, the method comprising:
  using an apparatus, the apparatus comprising a textured surface having a predetermined roughness, the textured surface configured to produce a first predefined vibration in the skin of a user of the apparatus on physical interaction with the skin of the user, wherein the roughness of the textured surface is configured such that the first predefined vibration produced by the physical interaction has a frequency which is detectable by a specific mechanical receptor in the skin of the user; and
  causing physical interaction between the textured surface and the skin of the user to produce a first predefined vibration which is detectable by a specific mechanical receptor in the skin of the user.

According to another aspect, there is provided a method, the method comprising:
  providing for the production of a predefined vibration in the skin of a user of an apparatus based on physical interaction between a textured surface and the skin of the user when a capacitive element is activated to produce a third predefined vibration in the skin of the user by using the apparatus, the apparatus comprising the capacitive element and the textured surface, both the capacitive element and the textured surface configured to independently produce predefined vibrations in the skin of the user of the apparatus,
  the textured surface having a predefined roughness to produce a first predefined vibration on independent physical interaction with the skin of the user,
  the capacitive element configured to allow establishment of an electric field of varying strength between the capacitive element and the user, variations in electric field strength configured to independently interact with the skin of the user to produce a second predefined vibration,
  and wherein the apparatus is configured such that the predetermined roughness of the textured surface provides a predetermined modification to the second predefined vibration produced by the variations in electric field strength to produce the third predefined vibration when the capacitive element is activated.

According to another aspect, there is provided a computer program, the computer program comprising code configured to control the height of actuators to define the roughness of a textured surface to produce a first predefined vibration on physical interaction with the skin of a user of an apparatus, the apparatus comprising the textured surface having a predetermined roughness, the textured surface configured to produce a first predefined vibration in the skin of a user of the apparatus on physical interaction with the skin of the user, wherein the roughness of the textured surface is configured such that the first predefined vibration produced by the physical interaction has a frequency and/or amplitude which is detectable by a specific mechanical receptor in the skin of the user, and wherein the textured surface comprises a plurality of actuating elements, each actuating element configured such that the height of the actuating element can be varied independently of the other actuating elements to enable the roughness of the textured surface to be modified.

According to another aspect, there is provided a computer program, the computer program comprising code configured to control variations in electric field strength to produce a second predefined vibration in the skin of a user independently of a textured surface using an apparatus, the apparatus comprising a capacitive element and the textured surface, both the capacitive element and the textured surface configured to independently produce predefined vibrations in the skin of a user of the apparatus, the textured surface having a predefined roughness to produce a first predefined vibration on independent physical interaction with the skin of the user, the capacitive element configured to allow establishment of an electric field of varying strength between the capacitive element and the user, variations in electric field strength configured to independently interact with the skin of the user to produce a second predefined vibration, and wherein the apparatus is configured such that the predetermined roughness of the textured surface provides a predetermined modification to the second predefined vibration produced by the variations in electric field strength to produce a third predefined vibration when the capacitive element is activated.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

Corresponding computer programs for implementing one or more of the methods disclosed are also within the present disclosure and encompassed by one or more of the described embodiments.

The above summary is intended to be merely exemplary and non-limiting.

BRIEF DESCRIPTION OF THE FIGURES

A description is now given, by way of example only, with reference to the accompanying drawings, in which:—

FIG. 2a illustrates schematically a textured surface comprising a series of columns;

FIG. 2b illustrates schematically a textured surface comprising a series of rows;

FIG. 2c illustrates schematically a textured surface comprising a grid;

FIG. 2d illustrates schematically a textured surface comprising a series of concentric circles;

FIG. 3a illustrates schematically a textured surface comprising a plurality of actuators in plan view;

FIG. 3b illustrates schematically a texture surface comprising a plurality of actuators in side view;

FIG. 4 illustrates schematically the generation of transverse waves in the textured surface of FIG. 3;

FIG. 5 illustrates schematically an electronic display comprising four selectable menu options;

FIG. 6 illustrates schematically the generation of a tactile image using the textured surface of FIG. 3;

FIG. 7a illustrates schematically a device comprising a textured surface positioned in front of an electronic display;

FIG. 7b illustrates schematically a device comprising a textured surface positioned behind an electronic display;

DESCRIPTION OF EXAMPLE ASPECTS/EMBODIMENTS

Figure 1A:
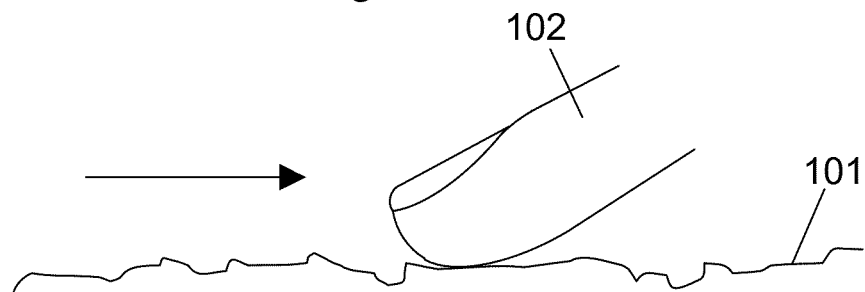
FIG. 1a illustrates schematically a surface with an arbitrary roughness.

FIG. 1a illustrates schematically a textured surface 101 (for a touch user interface of a portable electronic device) with an arbitrary roughness. When a finger 102 sweeps over a textured surface 101, the roughness of the surface causes vibrations in the skin which are detected by Merkel discs, Meissner corpuscles, and Pacinian corpuscles. When the surface 101 has an arbitrary roughness, the vibrations have a wide range of frequencies. As discussed in the background section, the Merkel disc is most sensitive to frequencies in the 5-15 Hz range, the Meissner corpuscle is most sensitive to frequencies in the 10-50 Hz range, and the Pacinian corpuscle is most sensitive to frequencies in the 200-400 Hz range. As a result, vibrational frequencies within these ranges are more strongly (i.e. mainly) detected than other vibrational frequencies. Furthermore, research has shown that some people are incapable of detecting certain textures. The reasons for this are currently unclear, but one hypothesis is that the receptors corresponding to the frequencies of vibration generated by these textures are damaged or lack sufficient sensitivity.

Figure 1B:
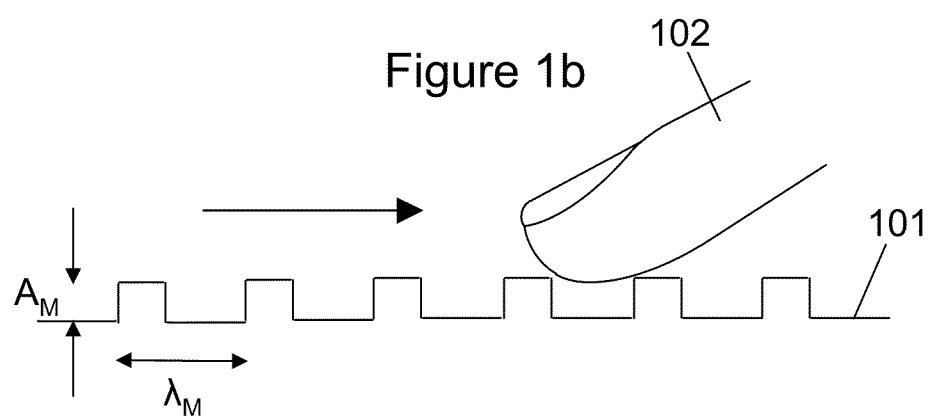
FIG. 1b illustrates schematically a surface with a roughness which has been tuned for detection by the Meissner corpuscle.
Figure 1C:
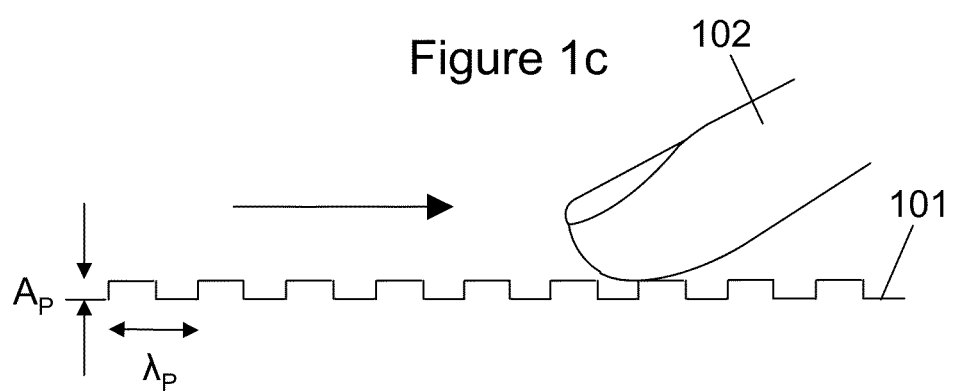
FIG. 1c illustrates schematically a surface with a roughness which has been tuned for detection by the Pacinian corpuscle.

It may be possible to improve the effectiveness of tactile feedback by inducing skin vibrations with frequencies that fall within the optimal range of a specific mechanical receptor. FIG. 1b illustrates schematically a surface 101 with a predetermined (periodic) roughness. In this case, the wavelength of the roughness, denoted "$\lambda_M$", has been chosen to produce a predefined vibration in the skin with a frequency which is detectable specifically by the Meissner corpuscle. The wavelength required to achieve this is dependent on the speed of the finger 102. For example, in order for the Meissner corpuscle to accurately detect vibrations at a finger speed of 0.1 m/s, the wavelength should be between 2 and 10 mm. Textures with roughness wavelengths outside of this range may also be detected, but the signal will be weaker. Likewise, for the detection of vibrations using the Pacinian corpuscle and a finger speed of 0.1 m/s, the optimum wavelength is between 0.25 and 0.5 mm, although a roughness lengthscale as low as 0.1 mm may also be detected. Furthermore, stimulation of the Markel disc at a finger speed of 0.1 m/s requires a roughness wavelength of between 6 and 20 mm. FIG. 1c shows a surface 101 with a wavelength, denoted "$\lambda_P$", specifically chosen to stimulate the Pacinian corpuscle.

For a given wavelength of roughness, the frequency of vibration changes with the speed of the finger 102. Although a change in finger speed could be used in theory to tune the frequency of vibration to a particular receptor, this is not always practical.

Whilst the wavelength of the roughness is an important consideration, so too is the amplitude of the roughness. For accurate detection of surface texture, the amplitude of vibration must be above a particular threshold for a given vibrational frequency. Given the operational frequencies of each receptor, the corresponding amplitude thresholds for the Pacinian corpuscle, Meissner corpuscle and Merkel disc are 1-100 μm, ~100 μm, and 100-200 μm, respectively. Therefore, in order to stimulate these receptors, the height of each feature should be above the corresponding amplitude threshold. In FIG. 1b, the amplitude of the roughness, "$A_M$" has been tuned to fit the Meissner corpuscle, whilst in FIG. 1c, the amplitude of the roughness, "$A_P$" has tuned to fit the Pacinian corpuscle.

The surface pattern (or structural configuration) of the textured surface is also important. FIG. 2a shows an apparatus comprising a textured surface 201 having a predetermined roughness. In this example, the textured surface 201 comprises a series of columns 203, the spacing of which is chosen to produce skin vibrations with a frequency which is detectable by a specific mechanical receptor when a finger (or other body part) is moved across the surface 201 along the x-axis. FIG. 2b shows another configuration in which the textured surface 201 comprises a series of rows 204. In this example, movement of the finger across the surface along the y-axis is required to induce the skin vibrations. A grid-like structure is shown in FIG. 2c. Unlike the textured surfaces of FIGS. 2a and 2b, the use of a grid 205 allows for accurate detection of texture in both the x and y axes, rather than just one or the other. A further configuration is illustrated in FIG. 2d. In this configuration, the textured surface 201 comprises a series of concentric circles 206, the circle spacing configured to produce vibrations in the skin which stimulate a specific mechanical receptor. An advantage of this surface pattern is the ability to induce vibrations in any radial direction. Another possibility, which could be used to produce a similar effect, would be to replace the circles 206 with swirls similar to those found on human fingerprints.

The various surface patterns described above could be incorporated within an apparatus by fabricating a fixed structure. This may be achieved, for example, using standard lithographic, printing or self-assembly methods. The material itself may be rigid or resilient, and may be made from a metal or plastics material. In addition, given that physical contact is required between the skin and the textured surface 201, the surface may comprise a coating configured to repel dirt, skin, dust, moisture or oil. Various nano coatings have been developed which have self-cleaning properties and may be suitable for this purpose. The coating may be hydrophobic, oleophilic, and/or scratch resistant. For example, the coating may comprise self-cleaning glass which is capable of preventing the build up of dirt through photocatalytic decomposition. The self-cleaning glass may comprise titanium dioxide. Examples of commercially available self-cleaning glass (which may be suitable for use with the present apparatus) include: Pilkington Activ™ by Pilkington, SunClean™ by PPG Industries, Neat Glass™ by Cardinal Glass Industries, SGG Aquaclean™ by Saint-Gobain, and Bioclean™ by Saint-Gobain. Another example of a commercially available coating which may be suitable for use with the present apparatus is DFI™ by Diamond Fusion International, Inc.

Furthermore, the textured surface 201 may comprise two or more regions, some regions having a different roughness than other regions. In this embodiment, the wavelength and/or amplitude of the surface features at each region may be different. For example, one region may comprise a roughness with a wavelength of 0.5 mm and amplitude of 50 µm, whilst another region may comprise a roughness with a wavelength of 5 mm and amplitude of 150 µm. It would also be possible to incorporate different surface patterns in different regions. For example, one region may comprise a series of parallel columns 203, whilst another region may comprise a series of concentric circles 206.

Although a fixed structure may be sufficient for some applications, as will be described in more detail later, other applications may require a surface structure that can be modified. This feature may be useful, for example, where one apparatus has multiple users, and one or more of these users are incapable of detecting particular textures due to specific damaged receptors. In this situation, the textured surface 201 could be configured to have a first predetermined roughness detectable by one type of receptor (e.g. the Meissner corpuscle), and then be reconfigured to have a second predetermined roughness detectable by another type of receptor (e.g. the Pacinian corpuscle). In this way, every user is able to experience some level of tactile feedback.

This may be achievable using a textured surface 301 comprising a plurality of actuating elements 307. This type of surface 301 is illustrated in plan view in FIG. 3a, and in side view in FIG. 3b. In this figure, the actuating elements 307 are arranged in a regular two dimensional array (although in practise they need not be). Each actuating element 307 is configured such that its height, "h", can be varied independently of the other actuating elements 307 (although in another embodiment one or more actuating elements 307 may be configured to move together so that they are maintained at the same height as one another). This enables the roughness (both frequency and amplitude) of the textured surface 301 to be changed. The actuating elements 307 may be pneumatic, hydraulic, electric, magnetic or piezoelectric actuators, and may be configured to convert an electrical signal into linear motion. In addition, the actuating elements 307 may have dimensions on the nanoscale (nm), microscale (µm) or macroscale (mm or cm).

In each of the above examples, movement of the finger (or other body part) whilst in physical contact with the textured surface 401 is necessary in order to induce the skin vibrations. The use of actuating elements 407, however, allows movement of the surface 401 instead. This feature enables detection of the surface texture without the need to move the finger, and may be achieved by varying the heights of the actuating elements 407 to generate transverse waves 408 in the textured surface 401, as illustrated in FIG. 4. As the waves 408 propagate over the surface 401, the peaks 409 of the waves 408 interact with the user's finger 402 and produce vibrations in the skin. In this configuration, each actuating element 407 moves up and down periodically, but out of sync with the adjacent actuating elements 407 to create tangential movement of the roughness with respect to the skin. The smoothness of the wave 408 depends on the number of actuating elements 407. The greater the number of actuating elements 407, the smoother the wave 408 can be made. The wavelength of the roughness, denoted "$\lambda_w$", can also be varied. A further advantage of having a greater number of actuating elements 407 is that it provides greater scope for varying the wavelength of the roughness, which in turn allows the frequency of vibration to be tuned to a particular receptor for a given finger speed.

Another way of tuning the frequency of vibration is to vary the speed of the wave 408, denoted "$v_w$". By increasing the speed 410 of the actuating elements 407, the speed of the wave 408 can be increased, resulting in a greater vibrational frequency. Using actuating elements 407, the amplitude of the wave, denoted "$A_w$", can also be tuned to a specific receptor by varying the height of the actuator 407.

One possible application of this technology is in portable electronic devices comprising display screens. As discussed previously, haptic technology is sometimes used in combination with touch sensitive displays to acknowledge on-screen key presses or to direct a user to particular content. In other devices, haptic technology is used to create a tactile image to supplement the visual information. The apparatus and methods described herein may be used to enhance the effectiveness of this tactile feedback.

FIG. 5 illustrates a touch sensitive electronic display 510 comprising a textured surface in front of the display screen of the electronic display. The electronic display 510 may be an organic LED, inorganic LED, electrochromic, electrophoretic, or electrowetting display. In this example, a user is presented with four possible menu options 511 (but could be any other on-screen selectable content). Once the user has decided on a particular menu option 511, he/she must touch the electronic display 510 over the menu option 511 to select it.

With a conventional touch sensitive electronic display 510, the user must reply on sight alone to guide his finger to the chosen menu option 511 for selection. When the electronic display 510 comprises a textured surface 501, however, the texture (roughness) can also be used to guide the user to the correct option 511 by providing the menu region with a different roughness to non-menu regions and/or by providing each or adjacent menu options with a different roughness. This may be particularly useful for someone with a visual disability (e.g. a low visual acuity), where the tactile information can be used instead of, or together with, the visual information. However, supplementary tactile information can also be useful for someone with perfect vision. For example, where the menu options 511 are located in close proximity to one another on the electronic display 510, greater user concentration is required in order to select the correct option 511. By providing additional tactile information, content selection can be performed with reduced cognitive effort.

To provide useful tactile information, the textured surface 501 may comprise multiple regions, each region having a different roughness. The different regions on the textured surface may correspond to the different menu options 511 shown on the electronic display 510. Based on the roughness of each region, the user can distinguish between the different menu options 511 and make the correct selection with reduced visual strain and user concentration. In this scenario, the region 512 of the textured surface 501 around the menu options 511 may have a different texture (e.g. smooth) than the regions corresponding to the various menu options 511 (e.g. rough). The textured surface 501 in this embodiment requires the use of actuating elements (rather than a fixed structure) to modify the roughness in accordance with the on-screen content. This is important, because the positions of the selectable content may vary from one screen to the next. Therefore, regardless of the on-screen position of the selectable content, the textured surface 501 is able to provide corresponding tactile information.

When the textured surface 501 is used in combination with a touch sensitive electronic display 501, the textured surface 510 should be substantially optically transparent to enable the user to view the visual content 511 displayed. Furthermore, the textured surface 501 should not affect the touch sensing capabilities of the electronic display 510. In one embodiment, the textured surface 501 (fixed structure or actuating elements) may comprise a touch sensitive component. Each individual actuating element may double as a touch sensitive component. In another embodiment, the electronic display 510 may comprise a touch sensitive component which can be indirectly activated via the textured surface 501. In these embodiments, the touch sensitive component may utilise resistive, surface acoustic wave, capacitive, force panel, optical imaging, dispersive signal, acoustic pulse recognition, or bidirectional screen technology.

As well as helping to guide a user to particular on-screen content, the textured surface 501 could be used to provide tactile feedback to acknowledge a key press. This may be used in conjunction with either touch screen keys (i.e. touch sensitive display) or conventional keys (i.e. keypad), and may be particularly advantageous to visually impaired users. With conventional touch sensitive displays 510, the user is normally informed of a successful key press by a visual change in the on-screen content. The present feature allows this visual information to be supplemented with tactile information.

Implementation of this feature requires the use of actuating elements rather than a fixed structure. Using the above example, when the user selects a particular menu option 511 on the electronic display 510, the actuating elements may generate a transverse wave (as described earlier) to stimulate specific receptors in the user's (stationary) hand. The transverse wave may cover the whole of the textured surface 501, or simply the region of the textured surface 501 corresponding to the menu option 511.

In another embodiment, the back of the device (i.e. the opposite side from the display screen of the electronic display 510) may comprise a textured surface 501 (actuating elements rather than a fixed structure). In this embodiment, the selection of on-screen content, using either touch screen keys or conventional keys, causes the actuating elements on the textured surface 501 to generate transverse waves. When the device is a hand-held device, the user's hand will typically be in physical contact with the back of the device during normal use of the device. As a result, the transverse waves on the textured surface 501 are able to interact with the user's skin causing detectable vibrations.

Where the device comprises conventional keys on a keypad, one or more of the keys may comprise a textured surface 501. In this scenario, the texture of each key may be sufficiently distinct to allow the user to differentiate between the keys using touch alone. The textured surface may also be used to provide acknowledgement of content selection. If used for distinguishing purposes, the textured surface 501 of each key may comprise a fixed structure or a variable structure. If being used to provide acknowledgment of content selection, however, actuating elements (i.e. a variable structure) will be required. Furthermore, on selection of on-screen content, the actuating elements may generate transverse waves which travel across the whole keypad, or may generate transverse waves which are restricted to the surface of the key that was pressed.

FIG. 6 illustrates schematically the generation of a tactile image 613 on a device using the textured surface 601, the textured surface comprising an array of actuating elements 607. In this embodiment, the device also comprises an electronic display. When the electronic display presents an image to the user, the textured surface 601 can be used to produce a tactile representation 613 of this image. In this way, the user is able to both see and feel the on-screen content. This use of tactile images 613 may be particularly advantageous for visually impaired users. There are two possible configurations. In the first configuration, the textured surface 601 is located on the front of the device (i.e. in front of the display screen of the electronic display), and in the second configuration, the textured surface 601 is located on the back of the device. In the first configuration the textured surface 601 should be substantially optically transparent to allow the user to view the electronic display. This is not an issue with the second configuration. The first configuration has the advantage that the user is able to relate the tactile content to the visual content more easily because both are generated from the same region of the display. The disadvantage, however, is that the user's fingers may obstruct his/her viewing. With the second configuration, the connection between the visual and tactile images is more difficult to appreciate because the tactile image 613 is generated from a different part of the device than the visual image, but the user's view is not obstructed by his/her fingers.

In addition to the textured surface 701, the apparatus described herein may comprise a capacitive element (illustrated in FIGS. 7a and 7b) to generate a second predefined vibration in the skin of the user independently of the textured surface 701. The capacitive element comprises an electrical conductor 714, an electrical insulator 715 and a power supply 716, the electrical insulator 715 positioned between the user and the electrical conductor 714. The power supply 716 is configured to charge the electrical conductor 714, and the electrical insulator 715 is configured to prevent a flow of current from the charged electrical conductor 714 to the skin of the user when the user is proximate to the capacitive element.

As shown in FIGS. 7a and 7b, the electrical conductor 714 and electrical insulator 715 of the capacitive element are located behind the electronic display 710. The textured surface 701 may be located at the front of the device (on the surface of the electronic display, FIG. 7a), or at the back of the device (FIG. 7b). The apparatus may comprise a touch sensitive component 717 as described previously.

The electrical insulator 715 may be unnecessary in the configuration of FIG. 7a when one or more of the textured surface 701, the electronic display 710, and the touch sensitive component 717 are electrically insulating. In this situation, the insulating material may be sufficient to prevent a flow of current from the charged electrical conductor 714 to the skin of the user, thereby negating the need for the electrical insulator 715. Likewise, the electrical insulator 715 may be removed from the configuration of FIG. 7b when the textured surface 701 is electrically insulating.

The capacitive element is configured to allow establishment of an electric field between itself and the user. To achieve this, the power supply 716 charges the electrical conductor 714, and the charge on the electrical conductor 714 induces charges of opposite polarity in the skin of the user when part of the user's body is in close proximity to the electrical conductor 714. The build up of charge on the electrical conductor 714 and the user is what forms the electric field. This may be visualised as a capacitor, where the electrical conductor 714 is the first electrode and the user is the second electrode, the first and second electrodes separated by an electrical insulator 715. The electrostatic force generated by the charge on the electrical conductor 714 attracts the charge on the user causing movement of the user's skin.

To generate vibration in the skin of the user, the power supply 716 varies the magnitude (and/or polarity) of charge on the electrical conductor 714 periodically. The variation of charge causes variations in electric field strength (and/or direction) which in turn causes vibration in the skin. By controlling the electric field strength, it is possible to tune the frequency and amplitude of the skin vibrations to a specific receptor.

The textured surface 701 and capacitive element are capable of producing vibrations in the skin of the user independently of one another. Whilst the textured surface 701 requires physical contact with the user in order to produce the vibrations, the capacitive element does not.

When the textured surface 701 and capacitive element interact with the skin of the user simultaneously, the roughness of the textured surface 701 can be controlled to provide a predetermined modification to the frequency (and/or amplitude) of the vibrations produced by the capacitive element. The combination of the textured surface 701 with the capacitive element therefore provides additional control over the skin vibrations.

The capacitive element may be formed as a single unit (as described above), or may comprise a plurality of segments. In the latter configuration, each segment is configured to allow establishment of an electric field between itself and the user independently of the other segments. In this way, each segment can be used to produce a different vibration in the skin of the user. This feature may be used in combination with the textured surface 701 to provide greater control of the perceived texture at different regions of the textured surface 701. The reasons for doing so are as described with reference to FIGS. 5 and 6.

Figure 8:
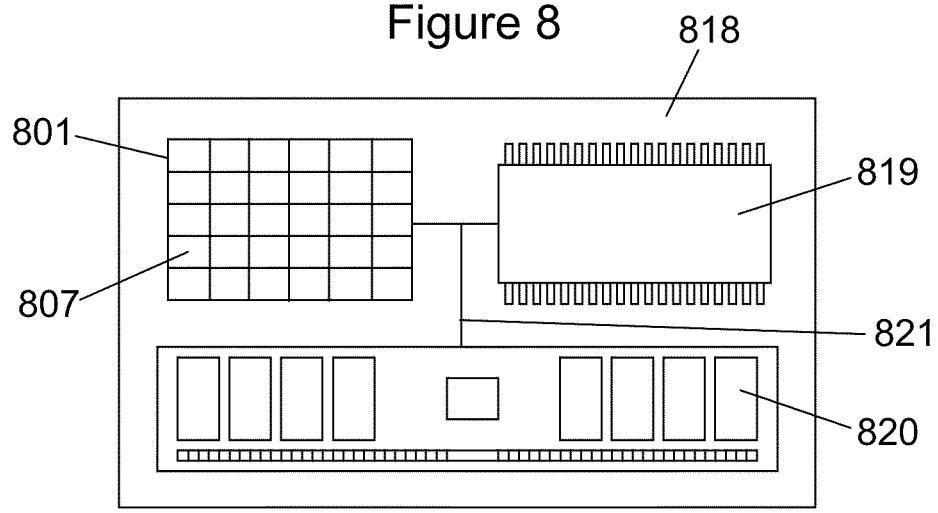
FIG. 8 illustrates schematically a device comprising the apparatus described herein.

FIG. 8 illustrates schematically an electronic device 818 comprising the textured surface 801 described herein. The device also comprises a processor 819 and a storage medium 820, which may be electrically connected to one another by a databus 821. The device 818 may be a portable electronic device, such as a portable telecommunications device.

The textured surface 801 is configured to provide a user with tactile feedback tuned to a specific mechanical receptor, and may comprise a plurality of actuating elements 807. A capacitive element may be used in combination with the textured surface 801 to provide the tactile feedback.

The storage medium 820 is configured to store computer code required to operate the apparatus, as described with reference to FIG. 10. The storage medium 820 may be a temporary storage medium such as a volatile random access memory, or a permanent storage medium such as a hard disk drive, a flash memory, or a non-volatile random access memory.

The processor 819 is configured for general operation of the device 818 by providing signalling to, and receiving signalling from, the other device components to manage their operation. In particular, the processor 819 is configured to control the height and motion of the actuating elements 807, and control the variations in electric field, by providing signalling to the actuating elements 807 and electrical conductor, respectively.

Figure 9:
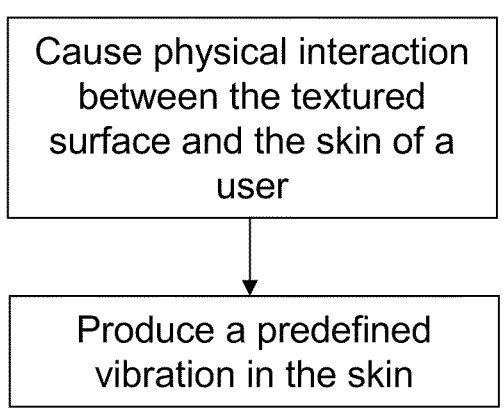
FIG. 9 illustrates schematically a method of producing a predefined vibration in the skin of a user of an apparatus.

The key steps of the method used to produce a predefined vibration in the skin of a user using the apparatus described herein are shown in FIG. 9.

Figure 10:
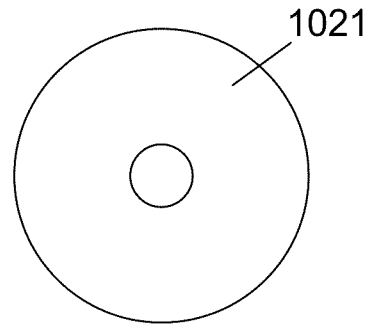
FIG. 10 illustrates schematically a computer readable media providing a program.

FIG. 10 illustrates schematically a computer/processor readable medium 1021 providing a computer program according to one embodiment. In this example, the computer/processor readable medium 1021 is a disc such as a digital versatile disc (DVD) or a compact disc (CD). In other embodiments, the computer/processor readable medium 1021 may be any medium that has been programmed in such a way as to carry out an inventive function. The computer/processor readable medium 1021 may be a removable memory device such as a memory stick or memory card (SD, mini SD or micro SD).

The computer program may comprise code configured to control the height of actuators to define the roughness of a textured surface to produce a first predefined vibration on physical interaction with the skin of a user of an apparatus, the apparatus comprising the textured surface having a predetermined roughness, the textured surface configured to produce a first predefined vibration in the skin of a user of the apparatus on physical interaction with the skin of the user, wherein the roughness of the textured surface is configured such that the first predefined vibration produced by the physical interaction has a frequency and/or amplitude which is detectable by a specific mechanical receptor in the skin of the user, and wherein the textured surface comprises a plurality of actuating elements, each actuating element configured such that the height of the actuating element can be varied independently of the other actuating elements to enable the roughness of the textured surface to be modified.

The computer program may comprise other code configured to control variations in electric field strength to produce a second predefined vibration in the skin of a user independently of a textured surface using an apparatus, the apparatus comprising a capacitive element and the textured surface, both the capacitive element and the textured surface configured to independently produce predefined vibrations in the skin of a user of the apparatus, the textured surface having a predefined roughness to produce a first predefined vibration on independent physical interaction with the skin of the user, the capacitive element configured to allow establishment of an electric field of varying strength between the capacitive element and the user, variations in electric field strength configured to independently interact with the skin of the user to produce a second predefined vibration, and wherein the apparatus is configured such that the predetermined roughness of the textured surface provides a predetermined modification to the second predefined vibration produced by the variations in electric field strength to produce a third predefined vibration when the capacitive element is activated.

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

It will be appreciated to the skilled reader that any mentioned apparatus, device, server or sensor and/or other features of particular mentioned apparatus, device, server or sensor may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus, device, server or sensor may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus, circuitry, elements, processor or sensor may have other functions in addition to the mentioned functions, and that these functions may be performed by the same apparatus, circuitry, elements, processor or sensor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the terms "signal" or "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus for a user interface of an electronic device, the apparatus comprising:
    a textured surface attached along a viewable side on a display screen of the electronic device, the textured surface having a predetermined roughness and the textured surface is transparent, wherein the textured surface comprises a structural configuration of fingerprint swirls and includes a coating having one or more of the following properties; hydrophobic or oleophobic, the textured surface includes a plurality of actuating elements, each actuating element configured such that the height of the actuating element can be varied independently of the other actuating elements to enable the roughness of the textured surface to be modified, the textured surface is configurable to produce a first predefined vibration in the skin of a first user of the apparatus on physical interaction when the skin of the first user contacts the textured surface and a second predefined vibration in the skin of a second user of the apparatus on physical interaction when the skin of the second user contacts the textured surface, wherein the roughness of the textured surface is configurable to a first user configuration such that the first predefined vibration produced by the physical interaction has a frequency and/or amplitude which is detectable by a specific mechanical receptor in the skin of the first user wherein the frequency and/or amplitude corresponds to the following type of mechanical receptor: Merkel discs, wherein the roughness of the textured surface is configurable to a second user configuration such that the second predefined vibration produced by the physical interaction has a frequency and/or amplitude which is detectable by a different specific mechanical receptor in the skin of the second user, where the apparatus is adapted to be reconfigurably switched between the first user configuration and the second user configuration; and a capacitive element configured to allow establishment of an electric field of varying strength between the capacitive element and a user of the apparatus, variations in electric field strength configured to interact with the skin of the user to produce another predefined vibration in the skin of the user independently of the textured surface.

2. The apparatus of claim 1, wherein the height of the actuating elements are variable independently of the other actuating elements to allow generation of transverse waves in the textured surface, interaction of the transverse waves with the skin of the user configured to produce the first predefined vibration.

3. The apparatus of claim 1, wherein the textured surface comprises two or more regions, the textured surface configured such that the roughness at one region is different from the roughness at another region.

4. The apparatus of claim 1, wherein the apparatus is configured such that the predetermined roughness of the textured surface provides a predetermined modification to the frequency and/or amplitude of the another predefined vibration produced by the variations in electric field strength to produce a third predefined vibration in the skin of the user when the capacitive element is activated which has a frequency and/or amplitude that is detectable by a specific mechanical receptor.

5. The apparatus of claim 1, wherein the capacitive element comprises an electrical conductor, an electrical insulator and a power supply, the power supply configured to charge the electrical conductor, the electrical insulator configured to prevent a flow of current from the charged electrical conductor to the skin of the user when the user is proximate to the capacitive element.

6. The apparatus of claim 5, wherein the power supply is configured to vary the magnitude of charge on the electrical conductor to cause the variations in electric field strength.

7. The apparatus of claim 1, wherein the capacitive element comprises a plurality of segments, each segment configured to allow establishment of an electric field of varying strength between the segment and the user independently of the other segments, variations in electric field strength configured to interact with the skin of the user to independently produce second predefined vibrations in the skin of the user.

8. The apparatus of claim 1, wherein the display screen comprises a touch sensitive component configured to allow a user of the display to interact directly with content shown on the display screen by touching the display screen.

9. The apparatus of claim 1 wherein the textured surface does not visually block any portion of the display screen.

10. The apparatus of claim 1 wherein the textured surface comprises a substantially planar surface covering the display screen.

11. An apparatus for a user interface of an electronic device, the apparatus comprising a capacitive element and a textured surface, both the capacitive element and the textured surface configured to independently produce predefined vibrations in the skin of a user of the apparatus, the textured surface having a predefined roughness, wherein the textured surface comprises a structural configuration of fingerprint swirls and includes a coating having one or more of the following properties; hydrophobic or oleophobic, to produce a first predefined vibration on independent physical interaction when the skin of the user is in contact with and moves across the textured surface, the capacitive element configured to allow establishment of an electric field of varying strength between the capacitive element and the user, variations in electric field strength configured to independently interact with the skin of the user to produce a second predefined vibration, and wherein the apparatus is configured such that the predetermined roughness of the textured surface provides a predetermined modification to the second predefined vibration produced by the variations in electric field strength to produce a third predefined vibration when the capacitive element is activated, where the textured surface is adapted to be reconfigured between a first user configuration and a second user configuration, where the first user configuration comprises the textured surface being shaped to provide a first predetermined roughness with a first user's skin which is detectable by a Merkel discs mechanical receptor of the first user's skin, and where the second user configuration comprises the textured surface being shaped to provide a second predetermined roughness with a second user's skin which is detectable by a different mechanical receptor of the second user's skin, where the apparatus is configured to switch between the first and second user configurations.

12. A method comprising:
providing for production of a predefined vibration in the skin of a user of an apparatus comprising an electronic device, based on physical contact between a textured surface and the skin of the user to produce a predefined vibration which is detectable by a specific mechanical receptor in the skin of the user by using the apparatus, the apparatus comprising the textured surface having a predetermined roughness wherein the textured surface comprises a structural configuration of fingerprint swirls and includes a coating having one or more of the following properties; hydrophobic or oleophobic, the textured surface being transparent and attached along a viewable side on a display screen of the electronic device, to produce the predefined vibration in the skin of the user of the apparatus on physical contact with the skin of the user, wherein the roughness of the textured surface is configurable such that the predefined vibration produced by the physical contact has a frequency and/or amplitude which is detectable by a specific mechanical receptor in the skin of the user, providing the apparatus with a first user configuration, where the first user configuration comprises the textured surface being configured to produce a first predefined vibration in the skin of a first user of the apparatus on physical interaction when the skin of the first user contacts the textured surface, where the first user configuration is configured to provide a first roughness of the textured surface such that the first predefined vibration produced by the physical contact has a frequency and/or amplitude which is detectable by a Merkel discs mechanical receptor in the skin of the first user, providing the apparatus with a second user configuration, where the second user configuration comprises the textured surface being configured to produce a second predefined vibration in the skin of a second user of the apparatus on physical interaction when the skin of the second user contacts the textured surface, where the second user configuration is configured to provide a second roughness of the textured surface such that the second predefined vibration produced by the physical contact has a frequency and/or amplitude which is detectable by a different mechanical receptor in the skin of the second user, and providing for switching between the first user configuration and the second user configuration.

13. A method comprising:

providing for production of a predefined vibration in the skin of a user of an apparatus comprising an electronic device, based on physical contact between a textured surface and the skin of the user when a capacitive element is activated to produce a third predefined vibration in the skin of the user by using the apparatus, the apparatus comprising the capacitive element and the textured surface, both the capacitive element and the textured surface configured to independently produce predefined vibrations in the skin of the user of the apparatus, the textured surface having a predefined roughness, wherein the textured surface comprises a structural configuration of fingerprint swirls and includes a coating having one or more of the following properties; hydrophobic or oleophobic, to produce a first predefined vibration on independent physical contact with the skin of the user, the capacitive element configured to allow establishment of an electric field of varying strength between the capacitive element and the user, variations in electric field strength configured to independently interact with the skin of the user to produce a second predefined vibration, and wherein the apparatus is configured such that the predetermined roughness of the textured surface provides a predetermined modification to the second predefined vibration produced by the variations in electric field strength to produce the third predefined vibration when the capacitive element is activated, wherein the apparatus is configurable to a first user configuration, where the first user configuration comprises the textured surface being configured to produce a first predefined roughness in the skin of a first user of the apparatus on physical interaction when the skin of the first user contacts the textured surface, where the first predetermined roughness of the textured surface provides the first predefined vibration with a frequency and/or amplitude which is detectable by a Merkel discs mechanical receptor in the skin of the first user, wherein the apparatus is configurable to a second user configuration, where the second user configuration comprises the textured surface being configured to produce the first predefined vibration in the skin of a second user of the apparatus on physical interaction when the skin of the second user contacts the textured surface, where the second predetermined roughness of the textured surface provides the first predefined vibration with a frequency and/or amplitude which is detectable by a different mechanical receptor in the skin of the second user, and providing for reconfigurably switching between the first user configuration and the second user configuration.

* * * * *